United States Patent [19]
Molina

[11] Patent Number: 5,921,033
[45] Date of Patent: *Jul. 13, 1999

[54] EXPANDABLE RETRACTABLE PORTABLE STRUCTURE WITH HINGED ROOF

[75] Inventor: Jose Ramon Molina, Santa Rosa, Calif.

[73] Assignee: Redi-Bilt Homes, Inc., Santa Rosa, Calif.

[*] Notice: This patent is subject to a terminal disclaimer.

[21] Appl. No.: 08/900,155

[22] Filed: Jul. 28, 1997

Related U.S. Application Data

[63] Continuation-in-part of application No. 08/662,530, Jun. 13, 1996, abandoned, and a continuation-in-part of application No. 08/772,936, Dec. 24, 1996, Pat. No. 5,815,988.

[51] Int. Cl.$^6$ .................................................. E04B 1/346
[52] U.S. Cl. ................... 52/67; 52/79.5; 52/68; 52/66; 296/26; 296/171
[58] Field of Search ................. 52/67, 68, 79.5, 52/91.3, 394, 395, 464, 741.4, DIG. 17, DIG. 15, 66, 516, 640, 123.1, 124.1, 125.2, 64; 296/26, 27, 171, 175

[56] References Cited

U.S. PATENT DOCUMENTS

| | | | |
|---|---|---|---|
| 4,078,341 | 3/1978 | Peterson et al. | 52/DIG. 15 X |
| 4,546,578 | 10/1985 | Behrmann | 52/67 |
| 4,603,518 | 8/1986 | Fennes | 52/66 |
| 4,706,420 | 11/1987 | Winkler | 52/DIG. 17 X |
| 5,265,394 | 11/1993 | Gardner | 52/640 |
| 5,546,709 | 8/1996 | Decker et al. | 55/66 |
| 5,815,988 | 10/1989 | Molina | 52/67 |

*Primary Examiner*—Carl D. Friedman
*Assistant Examiner*—Winnie Yip
*Attorney, Agent, or Firm*—Bruce H. Johnsonbaugh

[57] ABSTRACT

An expandable retract able portable structure is provided having a stationary portion and a movable portion. The movable portion pivotally encloses the stationary portion in the retracted configuration. A hydraulic, pneumatic or gear driven actuator carried by the floor of the stationary portion co-operates with a linkage mechanism to rotate the movable portion through approximately 90° to the expanded position. The roof of the movable portion is hingedly connected to one wall. The unit expands or retracts in one single pivoting motion through approximately 90°.

13 Claims, 8 Drawing Sheets

EXPANDABLE RETRACTABLE PORTABLE STRUCTURE WITH HINGED ROOF

CROSS-REFERENCE TO RELATED APPLICATIONS

This is a continuation-in-part of application Ser. No. 08/662,530 filed Jun. 13, 1996, now abandoned and of application Ser. No. 08/772,936 filed Dec. 24, 1996, now U.S. Pat. No. 5,815,988.

BACKGROUND AND BRIEF SUMMARY OF THE INVENTION

This invention relates generally to expandable retractable portable structures. More particularly, the invention relates to an actuating system and hinged roof design for expanding and retracting a portable structure.

The structure of the present invention can be used in trailers, motorized vehicles and also without a chassis. The structure without a chassis can be moved by cranes and flatbed trucks. The structure can be efficiently transported by boat or airplane in its retracted configuration, with or without a chassis.

The prior art includes the expandable-retractable portable structure of U.S. Pat. No. 5,265,394 dated Nov. 30, 1993. That patent teaches a structure which utilizes a relatively complex cable and winch system for expanding and retracting the structure. The design shown in that patent poses the inherent risk that, if the cable broke or became disconnected, the movable portion would fall, potentially injuring or killing workmen and damaging the structure. It is, therefore, desirable that a reliable and inherently safe actuation mechanism be provided for such expandable and retractable structures.

According to the present invention, a hydraulic, pneumatic, or gear driven actuation system is provided to move the structure between its expanded and retracted positions. The present invention utilizes an actuator carried either beneath or on top of the floor of the stationary portion of the structure. The actuating system is inherently safer, simpler and more rugged than the cable and winch system of U.S. Pat. No. 5,265,394.

A primary object of the present invention is to provide a safe, simple and rugged actuation mechanism for an expandable retractable portable structure.

A further object of the invention is to provide an expandable retractable structure having a hinged roof and which opens and closes in a single pivoting motion.

Another object of the invention is to provide an expandable and retractable portable structure having a plurality of rollers for carrying the weight of the roof of the movable portion.

Another object of the invention is to provide an improved roof seal joint which facilitates opening, closing and sealing the roof structure readily.

Other objects and advantages will become apparent from the following description and the drawings wherein:

BRIEF DESCRIPTIONS OF THE DRAWINGS

DETAILED DESCRIPTION OF THE DRAWINGS

Figure 1:
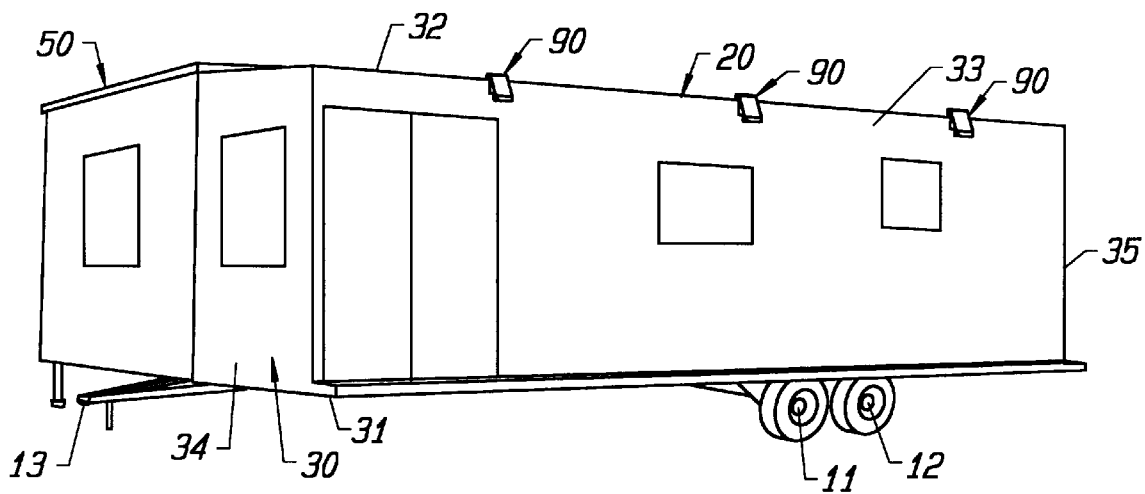
FIG. 1 is a perspective view of the expandable retractable portable structure mounted on a trailer chassis and in its expanded position.

FIG. 1 shows the expandable retractable structure generally referred to as 20 in its expanded position wherein maximum interior space is available for use. This structure has a stationary portion 30 with a fixed floor 31, a roof 32, an exterior side wall 33, a front wall 34, and a rear wall 35.

The structure in the embodiment shown in FIGS. 1–7 is carried by a trailer chassis including axles 11 and 12 and towing bar 13 as well as a standard and commercially available trailer frame not visible in FIG. 1. The stationary portion of the structure 30 is attached to the trailer chassis. As described below, the invention also has embodiments without a chassis.

The structure also includes a movable portion shown generally as 50 and described in greater detail below.

Figure 2:
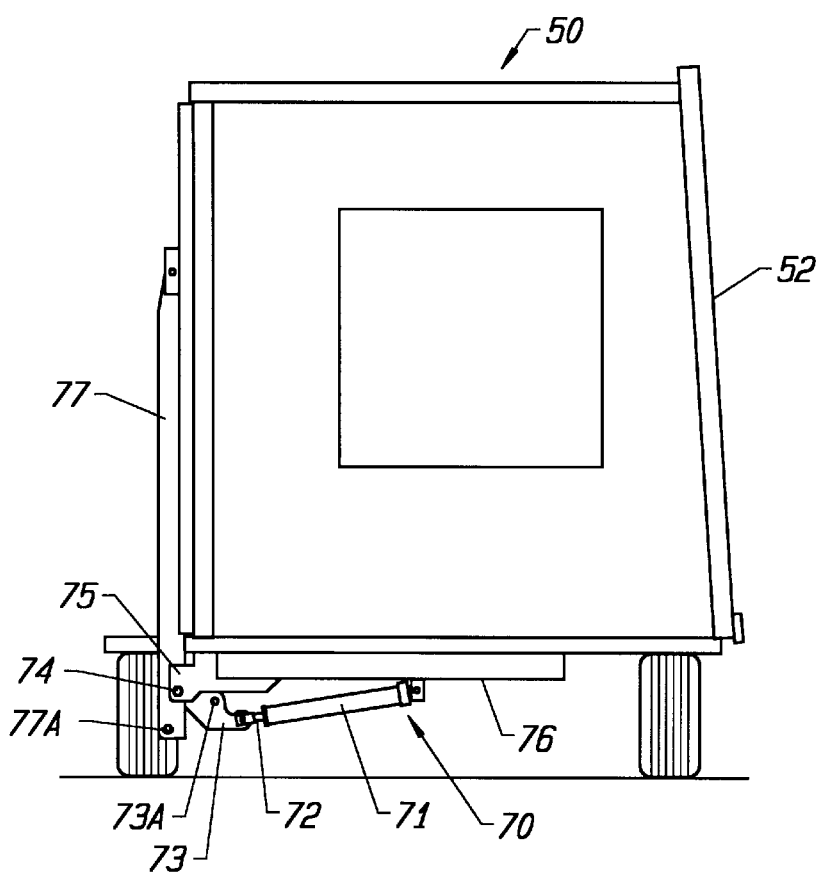
FIG. 2 is an elevational view looking at the front of one embodiment of the invention with the structure in its retracted position and the hydraulic actuating cylinder in position for traveling over the highway.
Figure 4:
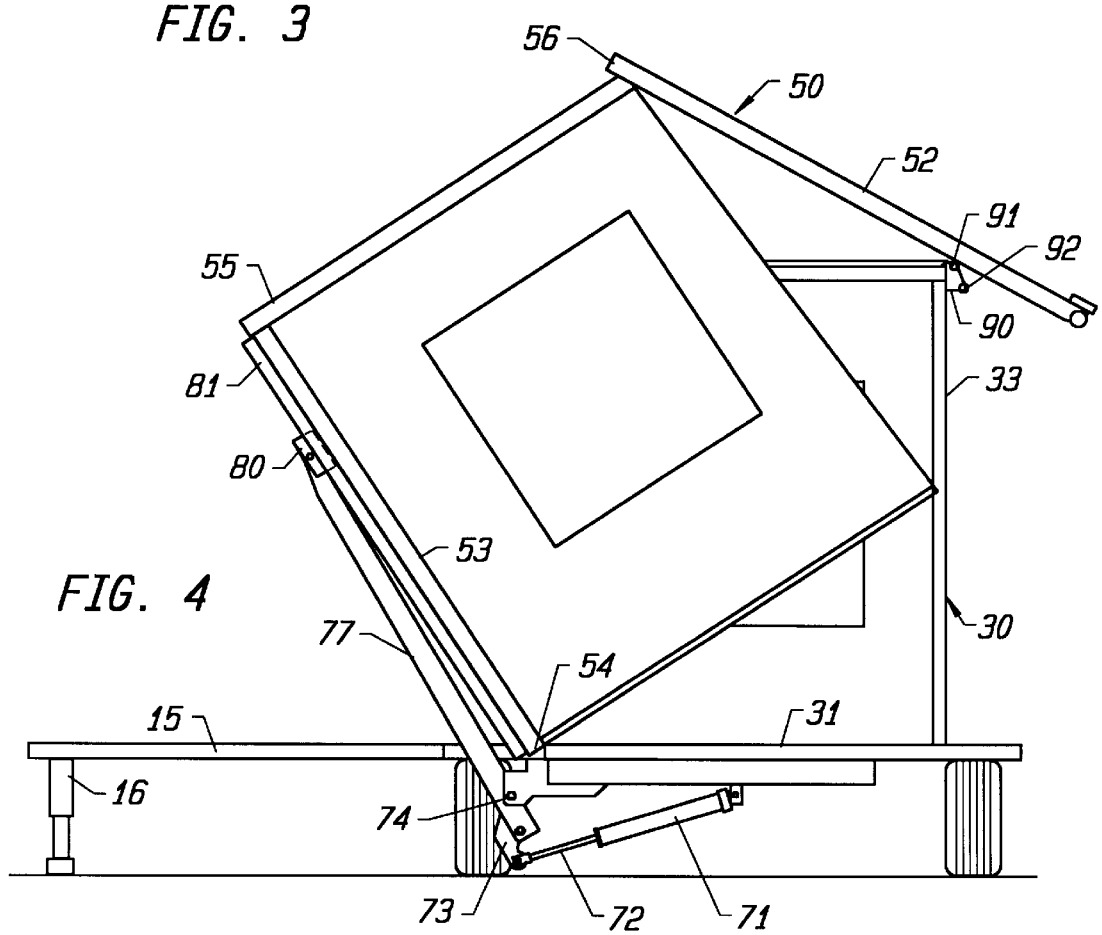
FIG. 4 is an elevational view from the front of the structure as the structure of FIGS. 1–3 is in the process of being expanded by the hydraulic actuation means.
Figure 5:
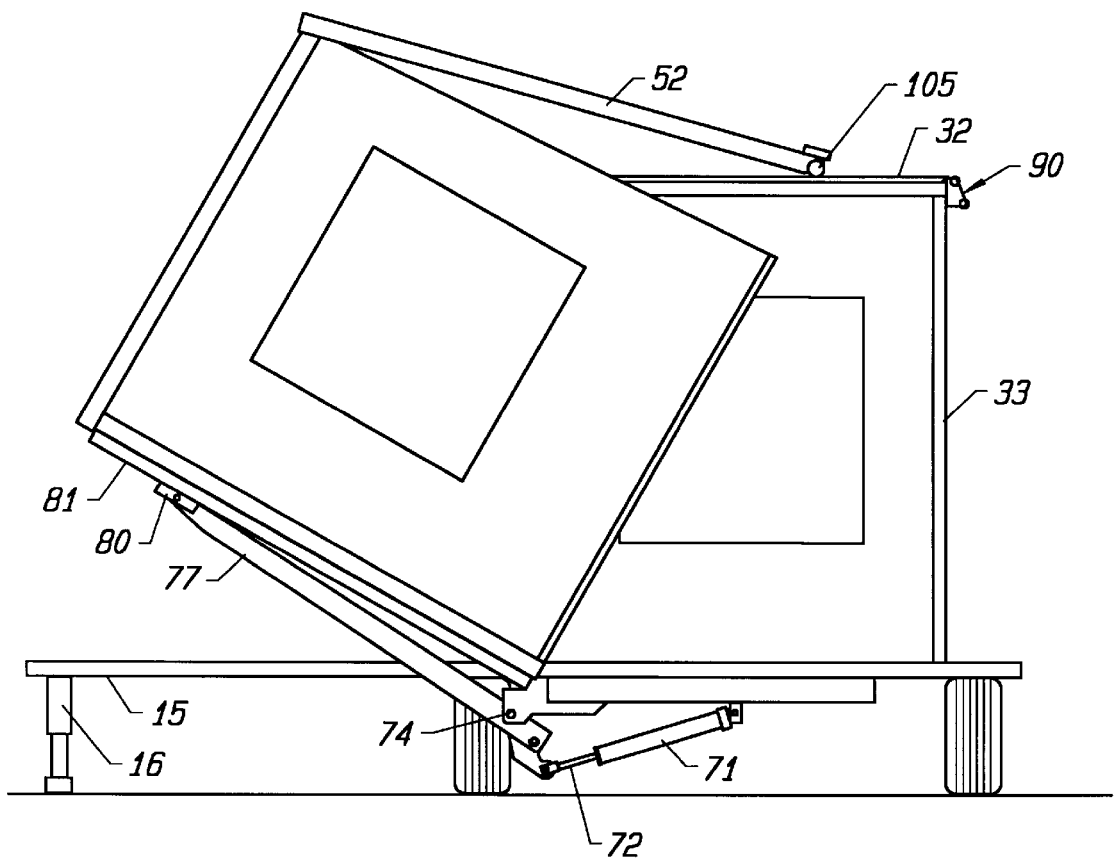
FIG. 5 is an elevational view from the front of the structure of FIGS. 1–4 as the structure is more fully expanded.
Figure 6:
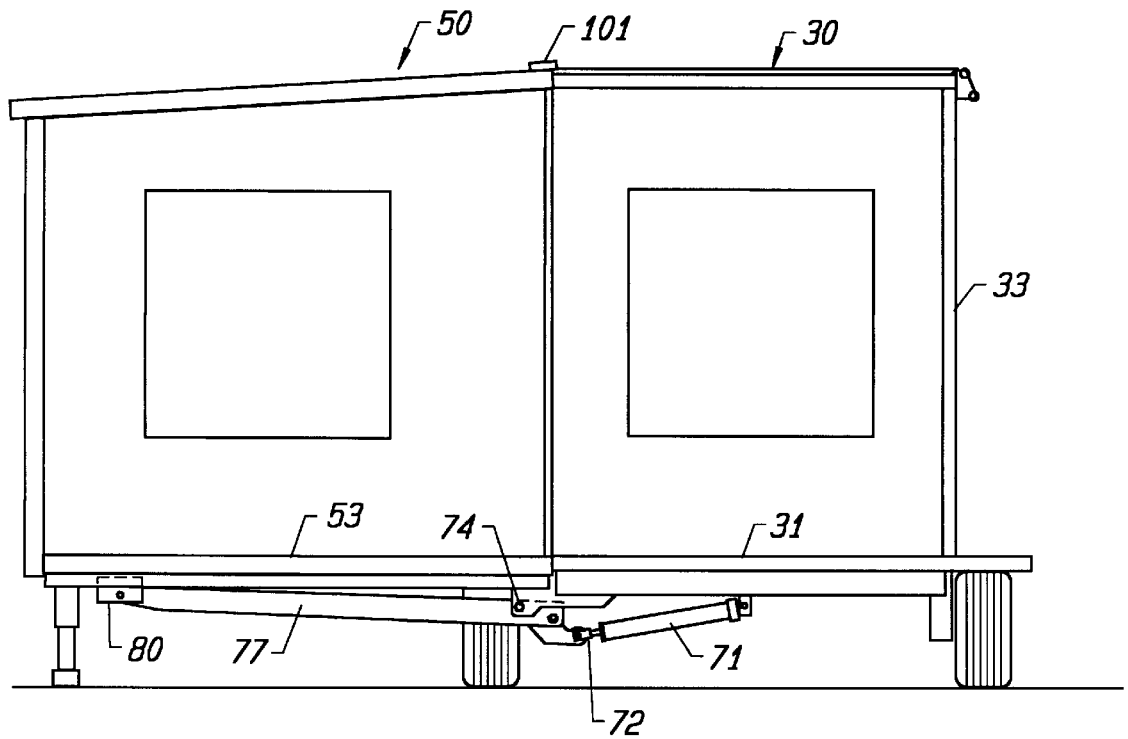
FIG. 6 is an elevational view from the front of the structure of FIGS. 1–5 as shown in its fully expanded position.

FIGS. 2–6 show the sequential operation of the actuation means 70 as it is connected to the movable section 50 and moves the structure from its retracted position shown in FIG. 2 to its expanded position shown in FIG. 6.

As shown in FIG. 2, in the retracted position of the structure, the movable portion 50 totally encloses the stationary portion 30. The roof 52 of movable portion 50 is in a generally vertical position and forms an outer wall of the retracted structure which is resistant to weather and vandalism.

The actuation means 70 includes a hydraulic cylinder 71 having a piston 72 connected to a pivot arm 73. Alternatively, actuation means 70 could comprise a pneumatic or gear driven system. Pivot arm 73 rotates about pivot point 74 which is carried by member 75 supported by a frame member 76. Support members 75 and 76 are permanently attached to the floor 31 of the stationary portion 30. In the position shown in FIG. 2, the pivot arm 73 has been disconnected from linkage arm 77 so that the piston 72 can be fully withdrawn into the cylinder 71 when the retracted structure is transported over highways or on ships or airplanes.

Figure 3:
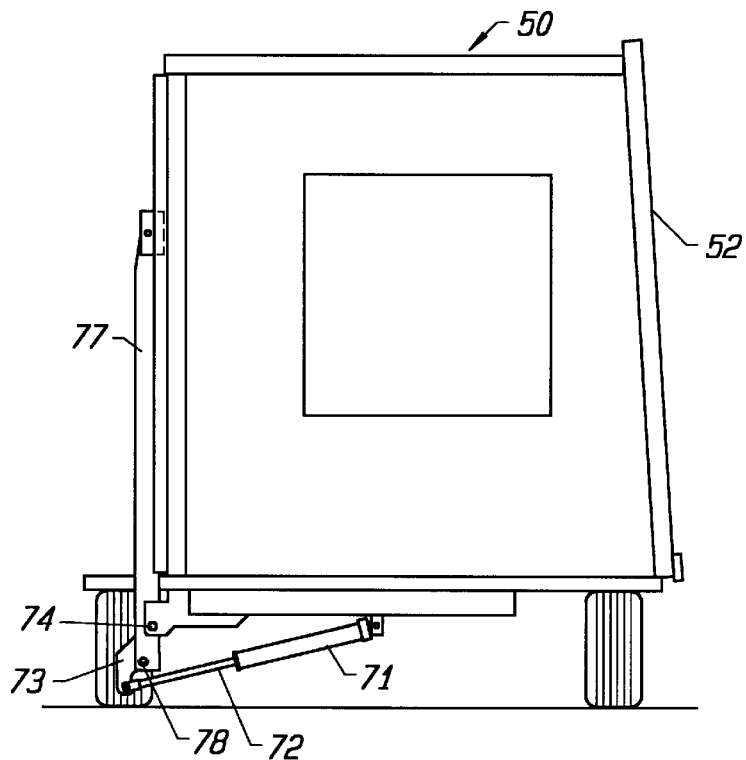
FIG. 3 is an elevational view from the front of the structure of FIGS. 1 and 2 with the cylinder and pivot plate connected to the movable portion of the structure.

Referring to FIG. 3, the first step of expanding the structure is to actuate the hydraulic cylinder 71 to extend piston rod 72 to its fully extended position shown in FIG. 3. In this position, pivot arm 73 is connected to linkage arm 77 by installing a pin 78 through linkage arm 77 and through pivot arm 73. Pin 78 extends through an opening 77a formed in linkage arm 77 and an opening 73a formed in pivot arm 73.

As shown in FIG. 4, hydraulic cylinder 71 has been driven to a position where piston rod 72 has been partially withdrawn into cylinder 71 which in turn rotates pivot arm 73 about pivot 74 and causes linkage arm 77 to rotate counterclockwise as shown in FIG. 4. As linkage arm 77 rotates about pivot 74, a slide 80 carried on the end of linkage arm 77 pulls against track 81 connected to the movable floor 53 and causes the movable portion to rotate as shown in FIG. 4. The phrase "linkage means" includes linkage arm 77, slide 80 and track 81.

The floor 53 of movable section 50 has an inner edge 54 and an outer edge 55. The inner edge 54 is hingedly connected to the floor 31 of the stationary portion 30. The roof 52 of movable portion 50 is hinged at its outer edge 56 so that the movable portion may pivotally enclose the stationary portion when it moves to its retracted position shown in FIGS. 2 and 3 by pivoting through approximately 90° in one single motion. Frame extension members 15 (FIG. 4) are placed into position on stands 16 to receive the weight of the movable portion 15 when it is in its fully expanded position shown in FIG. 6.

As shown best in FIG. 4, roller means 90 are carried at the upper portion of exterior wall 33 of the stationary portion and have two sets of roller wheels 91 and 92 which carry the weight of the roof 52 of movable section 50 during a portion of the expansion and retraction of the structure.

FIG. 5 shows a continuation of the process of expanding the structure wherein the hydraulic cylinder has been further driven in the direction of withdrawing piston 72 into cylinder 71 and linkage arm is further rotated around pivot 74.

FIG. 6 shows the structure in its fully expanded position wherein linkage arm 77 is horizontal and piston rod 72 is fully withdrawn into hydraulic cylinder 71.

Figure 7:
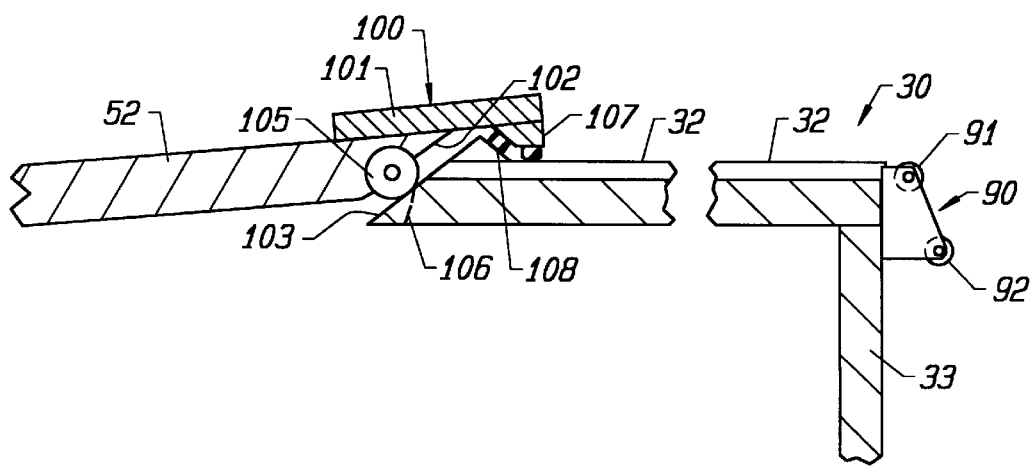
FIG. 7 is a sectional view of a portion of the apparatus showing the roof closure and sealing mechanism and the roller mechanism used to support the roof as the structure is opened and closed.

FIG. 7 shows in greater detail the roller means 90 carried by the outer wall 33 of stationary portion 30 and having an upper roller 91 and a lower roller 92, whereby the rollers 91 and 92 carry the weight of the roof 52 of movable portion 50 for a portion of the expansion and retraction process. FIG. 7 also shows in greater detail the roof closure and seal mechanism according to the present invention. The roof closure and sealing mechanism 100 includes a roof extension 101 which is simply an elongated piece of material carried by the inner edge of movable roof 52. The roof closure system also includes a pair of inclined surfaces 102 and 103 formed on the edges of movable roof 52 and stationary roof 32, respectively. The roof closure mechanism also includes a roller 105 carried by the edge of movable roof 52 which carries the weight of movable roof 52 during a portion of the expansion and retraction process as shown best in FIG. 5. As the structure approaches its fully expanded position shown in FIG. 7, roller 105 is about to roll into a recess in stationary roof 32 shown by phantom lines 106. When roller 105 moves downwardly into recess 106, the inclined surfaces 102 and 103 come into contact and elongated member 101 comes down into contact with stationary roof 32.

In the embodiment shown in FIG. 7, member 101 carries a tab 107 that extends over an elongated sealing strip 108 carried by the inner edge of stationary roof 32. A weathertight seal is thereby formed between the movable roof 52 and the stationary roof 32. As the retraction process is started, roller 105 is driven upwardly on the surface of recess 106 as the piston rod 72 is extended out of cylinder 71 and the process is simply reversed to retract the structure to its position shown in FIG. 3.

Figure 8:
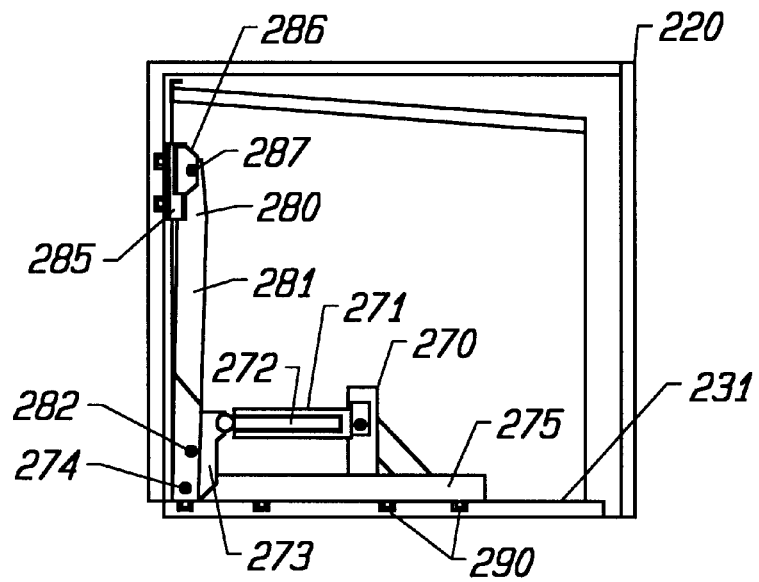
FIG. 8 is an elevational view of another embodiment of the invention showing the structure retracted and having an internal actuator.
Figure 9:
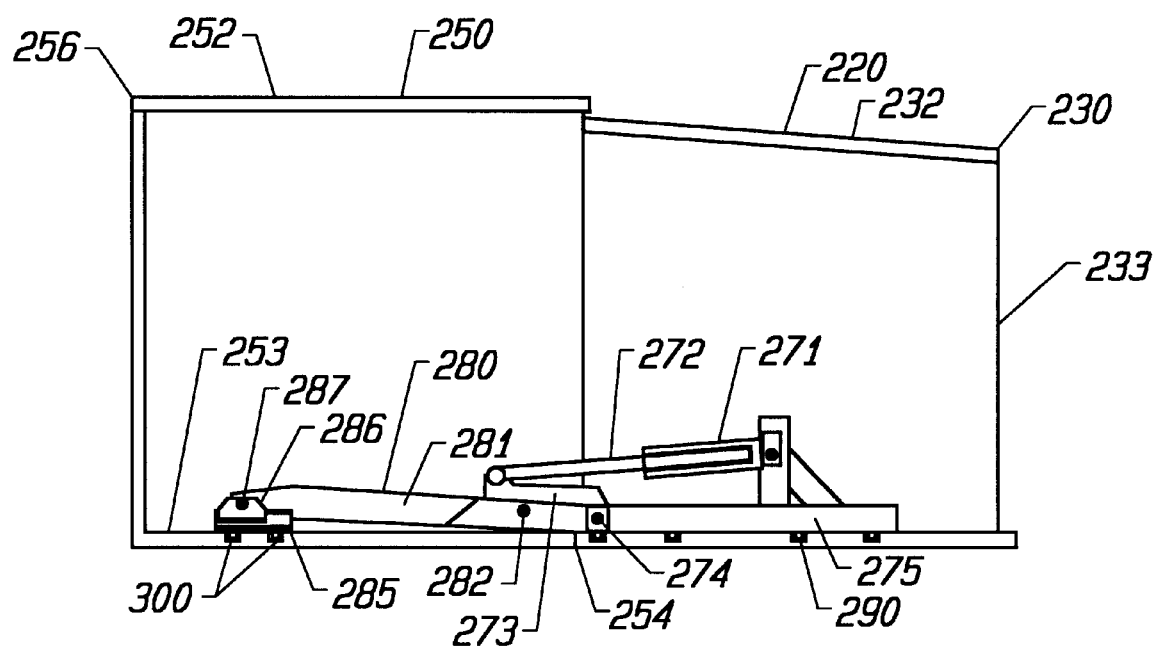
FIG. 9 is an elevational view of the apparatus of FIG. 8 in its expanded position.

FIG. 8 shows a second embodiment of the expandable retractable portable structure shown generally 220 in its retracted position and FIG. 9 shows the structure 220 of the present invention in its fully expanded position. The structure has a stationary portion 230 with a fixed floor 231, a roof 232, an exterior side wall 233, and front and rear walls that are not shown in FIGS. 8 and 9. The structure shown in the drawings is a portable structure without a chassis. It is to be understood that the structure can be mounted on a chassis as shown in FIGS. 1–7, for example, or alternatively, the structure can be utilized as a self-propelled vehicle such as a motor home.

The structure shown in FIGS. 8 and 9 is preferably made of a standard size to be capable of being handled by lifting cranes and flatbed trucks under international shipping standards. For example, without limiting the size of the structure, it may be 20 feet or 40 feet long (or shorter than 20 feet or longer than 40 feet) and capable of being shipped as a standard size container.

The structure also includes a movable portion shown generally as 250 having a movable floor 253, having an inner edge 254 which is hingedly connected to the floor 231 of stationary portion 230. The roof 252 of movable portion 250 is hinged at its outer edge 256 so that the movable portion may pivotally enclose the stationary portion 230 when it moves through approximately 90° in a single pivoting motion to its retracted position as shown best in FIGS. 14 and 15. Movable roof 252 in its retracted position is generally vertical and is resistant to weather and vandalism. Movable roof 252 in its expanded position is substantially horizontal in the sense that it is inclined slightly to ensure run-off of precipitation.

The actuation means of FIGS. 8 and 9 is shown generally as 270 and includes a hydraulic cylinder 271 having a piston 272 connected to a pivot arm 273. It is to be understood that the actuation means 270 can be of any type capable of operating pivot arm 273. For example, without limitation, actuation means includes one or more hydraulic and/or pneumatic cylinders. The actuation means could be an electrically driven or manual gear train or other type actuators. Pivot arm 273 rotates about pivot point 274 which is carried by base member 275. Base member 275 is removably attached to the floor 231 of stationary portion 230 by a first connecting means 290 described in greater detail below. Linkage means shown generally as 280 includes a linkage arm 281 which is connected to pivot arm 273 by installing a pin 282 through linkage arm 281 and through pivot arm 273.

As shown in FIG. 8, hydraulic cylinder 271 has been driven to a position where piston rod 272 is fully withdrawn into the cylinder 271. In the embodiment shown in FIGS. 8 and 9, in this position of the hydraulic cylinder and its piston rod, linkage arm 281 is in a vertical position and the structure is in its retracted position as shown in FIG. 8. As shown in FIG. 9, hydraulic cylinder 271 has been driven to a position where piston rod 272 is fully extended from cylinder 271 which causes linkage arm 281 to rotate counterclockwise to the expanded position shown in FIG. 9 wherein linkage arm 281 is in a horizontal position, having rotated through approximately 90°.

Linkage means 280 includes a track 285 which is removably connected to the floor 253 of the movable portion 250 by second connecting means 300. The linkage means 280 also includes a slide 286 pivotally carried by the end of linkage arm 281 by a pin 287 extending through linkage arm 281 and slide 286. The surfaces of the track 285 and the slide 286, which move against each other, are coated with teflon or other similar materials having a low coefficient of friction. The slide 286 moves relative to track 285 during the retraction and expansion operations.

Figure 10:
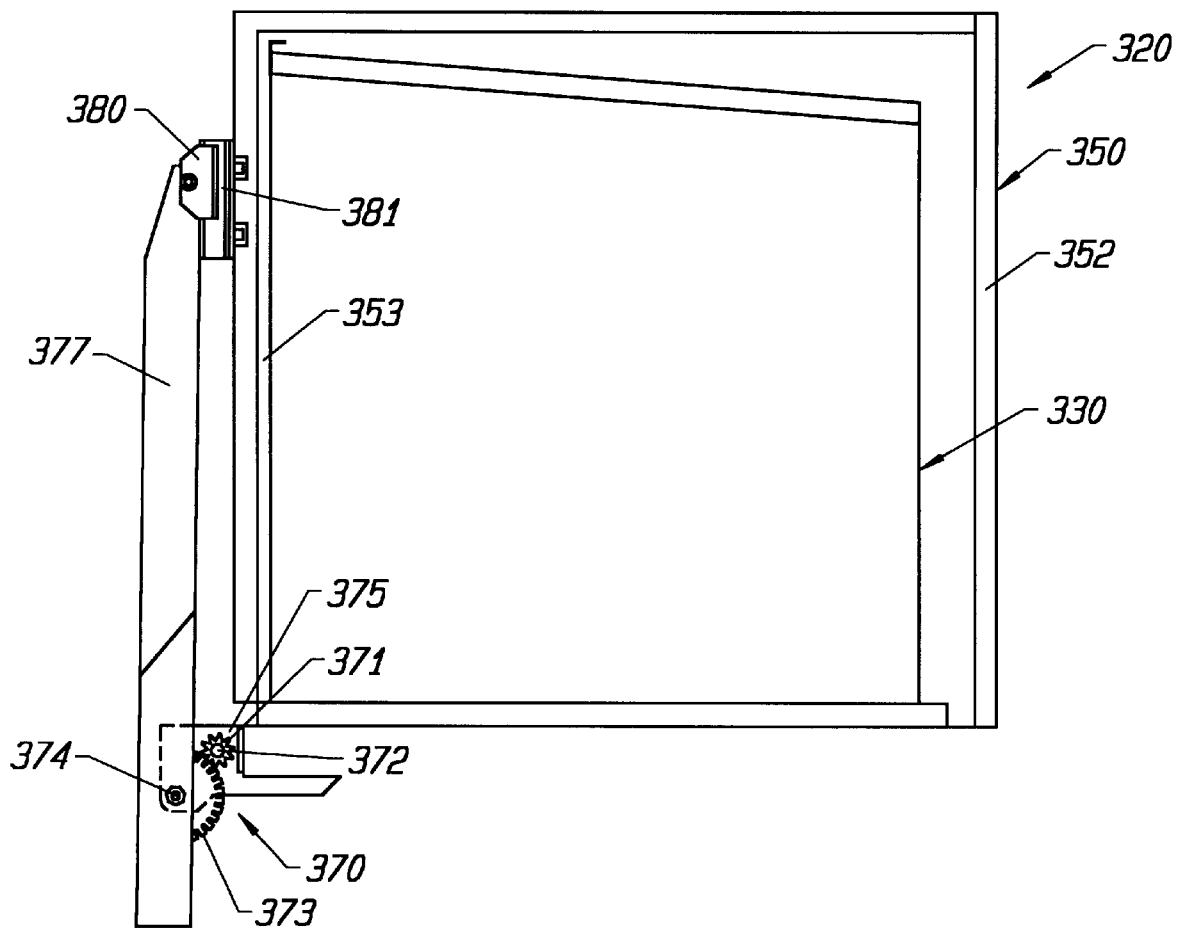
FIG. 10 is an elevational view of a gear driven embodiment in its retracted position.
Figure 11:
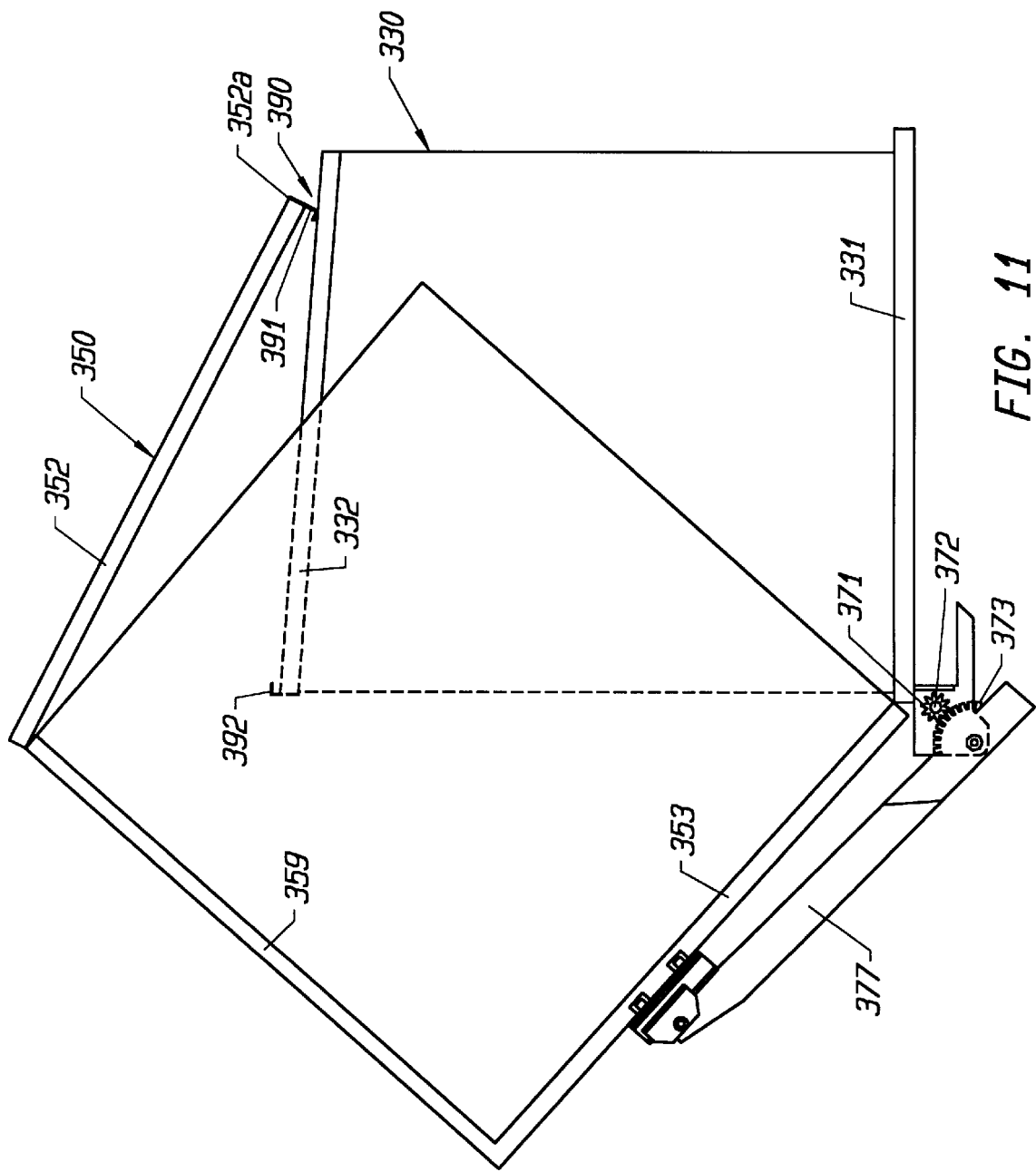
FIG. 11 is an elevational view of the apparatus of FIG. 10 in a partially expanded position.
Figure 12:
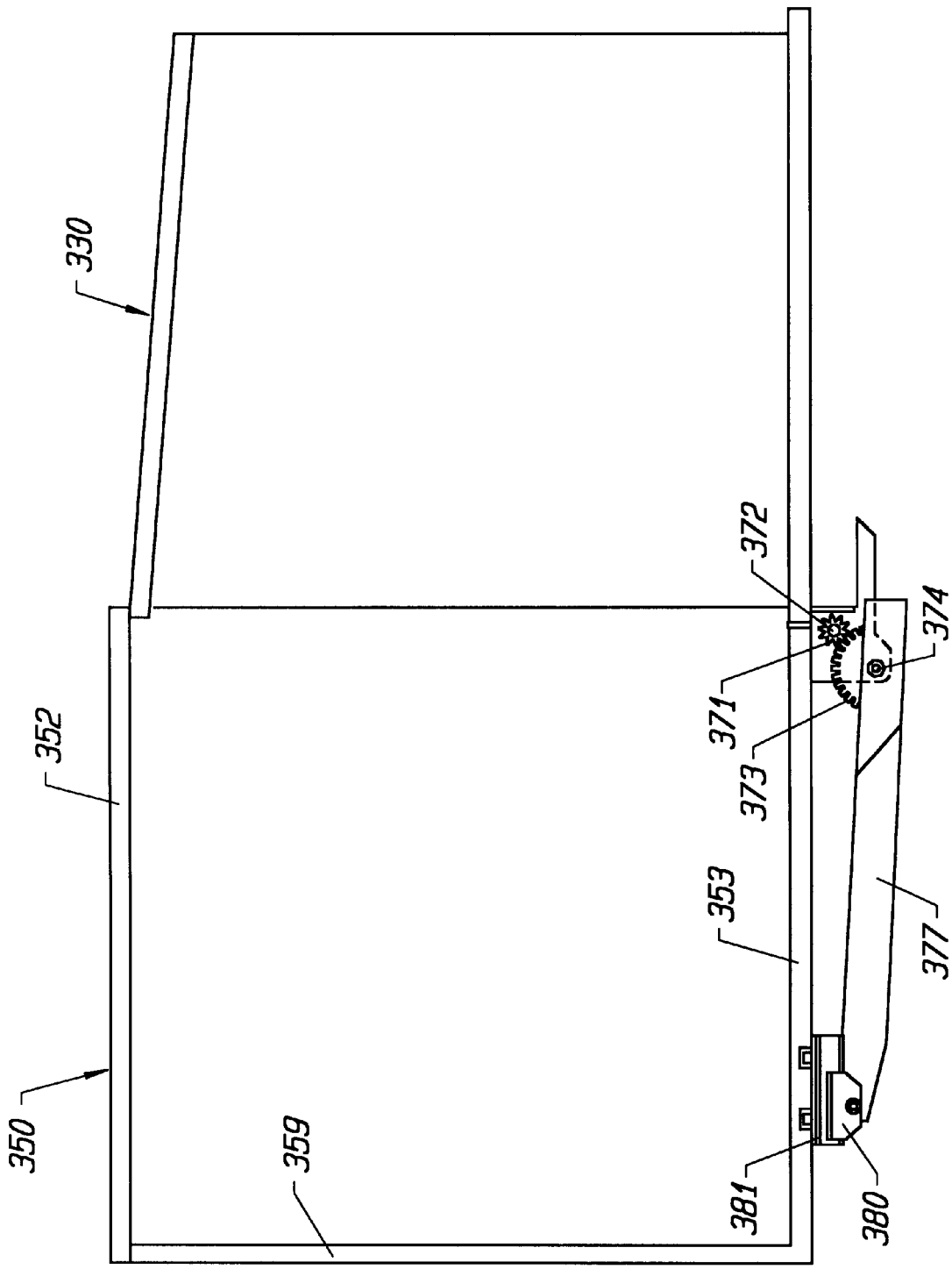
FIG. 12 is an elevational view of the apparatus of FIGS. 10 and 11 shown fully expanded.

FIGS. 10, 11 and 12 show a further embodiment of the invention herein the actuation means is a gear driven mechanism which may be driven manually or electrically. The embodiment shown in FIGS. 10–12 is illustrated without a chassis, but it is to be understood that the mechanism can be used with a trailer chassis as shown in FIGS. 1–6. FIG. 10 shows the structure generally as 320 having a stationary portion 330 and movable portion 350. The relationship between the stationary portion 330 and movable portion 350 is substantially the same as shown in FIGS. 1–6, with the only significant difference being that the embodiment shown in FIGS. 10–12 uses a gear driven actuation means 370 rather than a hydraulic or pneumatic actuator. The gear driven actuation means 370 includes a drive gear 371 carried by the stationary portion 330. Drive gear 371 rotates on a shaft 372 and may be driven by an electric motor (not shown) or in some instances gear 371 may be driven manually by connecting appropriate shafts and handles to shaft 372. A driven gear 373 engages drive gear 371 and pivots about a pivot 374 which in turn is carried by mounting plate 375 which is connected rigidly to the understructure (not shown) of stationary portion 330. Linkage arm 377 is rigidly connected to driven gear 373. As drive gear 371 rotates, it causes driven gear 373 to rotate about pivot 374 to the position shown in FIG. 11 and finally to the position shown in FIG. 12. Linkage arm 377 is connected by slide 380 and track 381 to the floor 353 of movable section 350. The movable roof 352 is hingedly connected to exterior movable wall 359 to allow the movable roof 352 to rotate relative to exterior wall 359 as shown best in FIG. 11. Movable floor 353 is also hingedly connected to stationary floor 331.

In the embodiment shown in FIGS. 10–12, the roof sealing means 390 includes a pair of interlocking and generally L-shaped brackets 391 and 392. Bracket 391 is carried by the free end 352*a* of movable roof 352. L-shaped bracket 392 is carried by the edge of stationary roof 332. The two brackets 391 and 392 interlock when the structure is in its expanded position shown in FIG. 12.

What is claimed is:

1. In an expandable retractable portable structure having a retracted configuration to facilitate the structure being transported, and an expanded configuration wherein maximum interior space is available for use; having a stationary portion with a fixed floor and walls; a movable portion having a floor, roof and walls, said movable portion pivotally enclosing said stationary portion in the retracted configuration of the structure; said floor of the movable portion having an inner edge and an outer edge and hinge means connected to said inner edge, the improvement comprising:

said roof of said movable portion being hingedly connected to the top of one wall of said movable portion, said roof forming a vertical, outer wall of said structure in its retracted position, hydraulic or pneumatic cylinder actuation means carried by the floor of said stationary portion, and linkage means carried by the floor of said movable portion and responsive to said actuation means for rotating said movable portion about said hinge means between said retracted and expanded configurations, said movable roof moving together with and simultaneously with said movable walls, said movable roof and movable walls pivoting simultaneously approximately 90° between said retracted and expanded configurations without the use of any cables or pulleys.

2. The apparatus of claim 1 wherein said actuation means comprises a hydraulic cylinder and a pivot arm connected to said hydraulic cylinder.

3. The apparatus of claim 2 wherein said linkage means comprises a track carried beneath the floor of said movable portion, a slide adapted to move on said track, and a linkage arm connecting said slide to said pivot arm.

4. The apparatus of claim 3 further comprising roller means mounted on said stationary portion adapted to carry the roof of said movable portion through a part of its travel as said movable portion is driven between its expanded and retracted positions.

5. The apparatus of claim 4 further comprising a roller carried by the inner edge of the movable roof to carry said movable roof through a part of its travel as it expands and retracts.

6. The apparatus of claim 5 further comprising roof closure means which includes a pair of inclined surfaces formed on the inner edges of the movable roof and stationary roof.

7. The apparatus of claim 6 wherein said roof closure means further comprises a recess formed in said inclined surface of said stationary roof, wherein said roller carried by said movable roof enters said recess as the movable roof is closed, and wherein said roller moves into said recess and lifts said movable roof as said hydraulic cylinder is actuated to commence the retraction of the structure.

8. The apparatus of claim 7 wherein roof closure means includes a raised seal carried by the inner edge of said stationary roof and a tab carried by the inner edge of said movable roof, said tab contacting said raised seal in the expanded position of the structure.

9. The apparatus of claim 1 wherein said actuation means comprises a drive gear carried by said stationary floor and a driven gear carried by said linkage means.

10. An expandable retractable portable structure having a retracted configuration to facilitate the structure being transported, and an expanded configuration wherein maximum interior space is available for use, comprising:

a stationary portion having a fixed floor, roof and walls, a movable portion having a floor, roof and walls, said movable portion pivotally enclosing said stationary portion in the retracted configuration of the structure, said floor of the movable portion having an inner edge and an outer edge, said roof of said movable portion being hingedly connected to the top of one wall of said movable portion, said roof forming a vertical, outer wall of said structure in its retracted position, said outer wall being resistant to weather and vandalism, said movable roof moving together with and simultaneously with said movable walls, said movable roof and movable walls pivoting simultaneously approximately 90° between said retracted and expanded configurations, hinge means connected to said inner edge of the floor of said movable portion, actuation means carried by the floor of said stationary portion, and linkage means carried by the floor of said movable portion and responsive to said actuation means for rotating said movable portion about said hinge means between said retracted and expanded configurations, and simultaneously moving the roof of the movable portion between said vertical position and a substantially horizontal position on top of the walls of the movable portion without the use of any cables or pulleys.

11. The apparatus of claim 10, wherein said actuation means comprises a hydraulic cylinder.

12. The apparatus of claim 10, wherein said actuation means comprises a pneumatic cylinder.

13. The apparatus of claim 10, wherein said actuation means comprises a gear drive mechanism.

\* \* \* \* \*